US012611891B2

(12) United States Patent  
Li

(10) Patent No.: US 12,611,891 B2  
(45) Date of Patent: Apr. 28, 2026

(54) COMPOSITE POWERED WHEEL SET, TRAIN, WHEEL-RAIL SYSTEM, AND TRAIN CONTROL METHOD

(71) Applicant: SOUTHWEST JIAOTONG UNIVERSITY, Chengdu (CN)

(72) Inventor: Qunzhan Li, Chengdu (CN)

(73) Assignee: SOUTHWEST JIAOTONG UNIVERSITY, Chengdu (CN)

( * ) Notice: Subject to any disclaimer, the term of this patent is extended or adjusted under 35 U.S.C. 154(b) by 612 days.

(21) Appl. No.: 18/018,343

(22) PCT Filed: Apr. 29, 2021

(86) PCT No.: PCT/CN2021/090987  
§ 371 (c)(1),  
(2) Date: Jan. 27, 2023

(87) PCT Pub. No.: WO2022/021978  
PCT Pub. Date: Feb. 3, 2022

(65) Prior Publication Data  
US 2023/0202234 A1 Jun. 29, 2023

(30) Foreign Application Priority Data  
Jul. 29, 2020 (CN) .......................... 202010742661.7

(51) Int. Cl.  
*B60B 17/00* (2006.01)  
*B60B 11/02* (2006.01)  
(Continued)

(52) U.S. Cl.  
CPC .......... *B60B 17/0082* (2013.01); *B60B 11/02* (2013.01); *B60B 17/00* (2013.01); (Continued)

(58) Field of Classification Search  
CPC ......... B60B 11/02; B60B 17/02; B60B 17/00; B60B 17/0082; B60B 37/04; B61B 13/02  
See application file for complete search history.

(56) References Cited

U.S. PATENT DOCUMENTS 2,155,564 A * 4/1939 Schippel ................. B60C 19/00  
                                                      295/12  
2006/0137917 A1 6/2006 Chamaillard et al.  
(Continued)

FOREIGN PATENT DOCUMENTS

CN 1822978 A 8/2006  
CN 1836921 A 9/2006  
(Continued)

OTHER PUBLICATIONS

Extended European Search Report issued on Jul. 26, 2023 for European Patent Application No. 21851228.3.

*Primary Examiner* — Cheng Lin  
(74) *Attorney, Agent, or Firm* — Volpe Koenig

(57) ABSTRACT

The present disclosure provides a composite powered wheel set, a train, a wheel-rail system and a train control method. The composite powered wheel set comprises two booster wheels and two support wheels mounted on a driving axle. The booster wheels are fixedly mounted on two ends of the driving axle, the support wheels are mounted on the driving axle via bearings, the moving axle is connected to a first transmission device, which is connected to a first power mechanism, and the driving axle is further connected to a train bogie via a connecting device. Booster wheels and booster rails are provided to improve anti-skid performance, so the train will not skid when running on a steep slope or under a heavy traction load. Restrictions on the railway slope, train traction load, and train speed are eliminated to a great extent, and the application scope of the wheel rails is expanded.

4 Claims, 1 Drawing Sheet

(51) Int. Cl.
    *B60B 17/02*       (2006.01)
    *B60B 37/04*       (2006.01)
    *B60B 37/10*       (2006.01)
    *B61B 13/02*       (2006.01)

(52) U.S. Cl.
    CPC .............. *B60B 17/02* (2013.01); *B60B 37/04*
        (2013.01); *B60B 37/10* (2013.01); *B61B 13/02*
                (2013.01)

(56)             References Cited

U.S. PATENT DOCUMENTS

| | | | |
|---|---|---|---|
| 2010/0314850 | A1 | 12/2010 | Harle |
| 2020/0047570 | A1 | 2/2020 | Seitel et al. |

FOREIGN PATENT DOCUMENTS

| | | | | |
|---|---|---|---|---|
| CN | 101784400 | A | 7/2010 | |
| CN | 101890878 | A | 11/2010 | |
| CN | 102555665 | A * | 7/2012 | |
| CN | 106183617 | A | 12/2016 | |
| CN | 108688400 | A | 10/2018 | |
| CN | 109131413 | A | 1/2019 | |
| CN | 110228487 | A * | 9/2019 | .............. B61F 13/00 |
| CN | 110576869 | A * | 12/2019 | ......... B60B 17/0006 |
| CN | 110615013 | A * | 12/2019 | ............... B61F 9/00 |
| CN | 110949415 | A * | 4/2020 | ............ B61B 13/02 |
| DE | 102010012287 | B4 * | 11/2015 | ............ B60B 17/02 |
| EP | 3611653 | A1 | 2/2020 | |
| KR | 20140131224 | A * | 11/2014 | .......... B61B 13/125 |
| WO | 2004005048 | A | 1/2004 | |
| WO | WO-2017071119 | A1 * | 5/2017 | ............... B61F 5/24 |

\* cited by examiner

COMPOSITE POWERED WHEEL SET, TRAIN, WHEEL-RAIL SYSTEM, AND TRAIN CONTROL METHOD

CROSS REFERENCE TO RELATED APPLICATIONS

This application is a 35 USC § 371 National Stage application of International Patent Application No. PCT/CN2021/090987, which was filed Apr. 29, 2021, entitled "COMPOSITE POWER WHEEL PAIR, TRAIN, WHEEL RAIL SYSTEM, AND TRAIN CONTROL METHOD" and claims priority to Chinese Patent Application No. 202010742661.7, filed Jul. 29, 2020, which are incorporated herein by reference as if fully set forth.

FIELD

The present disclosure relates to the technical field of track traction and train controlling, in particular to a composite powered wheel set, a train, a wheel-rail system and a train control method.

BACKGROUND

In a steep slope section, skidding in a longitudinal direction may exist between the ordinary powered wheels of a train and the running rails (steel rails), resulting in traction loss and failure in normal operation of the train or resulting in braking force loss and failure in normal stop of the train. In addition, the problem of skidding in the longitudinal direction limits the slope of the railway line (tracks) and the traction load and speed of the train, consequently limits the scope of application of ordinary wheel rails.

In view of above problems, a toothed rail structure was proposed. The toothed rail structure can solve the problem of transportation on steep slope wheel rails. In more than one hundred years, various toothed rails were invented and many of them were implemented. As a result, steep slope tourist and sight-seeing railways in mountainous areas have yielded brilliant results. However, toothed rails have many shortcomings, for example, the meshing accuracy is low, and the train travel speed is slow and doesn't match high-speed travelling on wheel rails; gear alignment is required for the transition from wheel rails to toothed rails, the gear alignment mechanism is complex and may cause gear collision easily, bringing adverse effects on normal train operation and safety; in the case that two or more train carriages are equipped with gears to increase the power and traction, the clearance of the coupler may cause out-of-synchronism between the gears and the toothed rails, and may cause gear collision and potential safety hazards easily.

SUMMARY

In a first aspect, the object of the present disclosure is to provide a composite powered wheel set, which can effectively increase the adhesion to the wheel rails and the anti-skid performance. The object of the present disclosure is attained with the following technical solution:

A composite powered wheel set, comprising a driving axle, two booster wheels and two support wheels, wherein the support wheels are arranged on two ends of the driving axle, the booster wheels are arranged at the outer side of the support wheels respectively, the support wheels are mounted to the driving axle via inner rings of bearings, the driving axle is connected to a first transmission device via gears, the first transmission device is connected to a first power mechanism, and the driving axle is connected to a train bogie via a series of suspensions.

The booster wheel is a rubber wheel and comprises a metal rim and a rubber tire, wherein the metal rim is fixed to the driving axle, the rubber tire has adjustable air pressure, and the tread of the rubber tire is provided with patterns.

The radius of the booster wheel is smaller than that of the support wheel.

In a second aspect, the object of the present disclosure is to provide a train using the composite powered wheel set described above, which can effectively solve the problem of traction switching during upslope and downslope running.

The object of the present disclosure is attained with the following technical solution: a train using the composite powered wheel set, comprising an ordinary powered wheel set composed of an ordinary driving axle and wheels, wherein the ordinary driving axle is connected to a second transmission device, the second transmission device is connected to a second power mechanism, the ordinary driving axle is connected to a train bogie via a series of suspensions, and the ordinary powered wheel set and the composite powered wheel set are mounted to different bogies respectively.

In a third aspect, the object of the present disclosure is to provide a wheel-rail system comprising the composite powered wheel set described above, which can effectively solve the problem of skidding in the longitudinal direction when the train travels on a slope section with a slope greater than or equal to 3%.

The object of the present disclosure is attained with the following technical solution: providing booster rails on two sides of the main line in parallel to the running rails before the slope section with a slope greater than or equal to 3%.

The surface of the booster rail is provided with a rubber sleeve or diagonal patterns.

The booster rails are laid on a slope section with a slope greater than or equal to 3%.

The booster rails are further laid on a railway line before the slope section with a slope greater than or equal to 3% and a railway line after the slope section with a slope greater than or equal to 3%, and both the length of the booster rails before the slope section with a slope greater than or equal to 3% and the length of the booster rails after the slope section with a slope greater than or equal to 3% are greater than or equal to the train length.

In a fourth aspect, the object of the present disclosure is to provide a method for controlling the train described above, which is applied in a train control system and comprises:

controlling the first power mechanism to power on, and controlling the second power mechanism to power off at the same time, as long as any of the booster wheel of the train comes into contact with a booster rail; and controlling the first power mechanism to power off, and controlling the second power mechanism to power on at the same time, if all of the booster wheels of the train leave booster rails;

wherein the booster rails are laid in a way that they are fitted well with the booster wheels of the train.

According to the present disclosure, booster wheels and booster rails are provided to improve the anti-skid performance of the wheel rails, so that the train will not skid when running on a steep slope section or under heavy traction load, thereby the limitations on the slope of the railway (tracks) and the traction load and speed of the train are eliminated to a great extent; besides, the support wheels cooperate with the running rails, so that the train runs smoothly and steadily, thereby the application scope of the wheel rails is expanded.

I. Compared with the prior art, the present disclosure attains the following beneficial effects:

II. The present disclosure is applicable to steep slope rail transportation as well as tourist and sight-seeing railways in mountainous areas.

The present disclosure is applicable to heavy haul railways.

III. Compared with the existing technique of combined bogie toothed railways, power conversion devices (e.g., clutch) and eccentric setting mechanisms are omitted, the train speed can be higher, and the train can operate more stably.

IV. The present disclosure has a simple structure, employs a reliable technique, and is easy to implement.

Reference Numbers: 1-booster wheel, 2-booster rail, 3-support wheel, 4-running rail, 5-metal rim, 6-driving axle, 7-bearing, 8-first transmission device, 9-first power mechanism.

DETAILED DESCRIPTION

The present disclosure will be further detailed below in embodiments, with reference to the accompanying drawings, to provide better understanding on the present disclosure.

Embodiment 1

Figure 1:
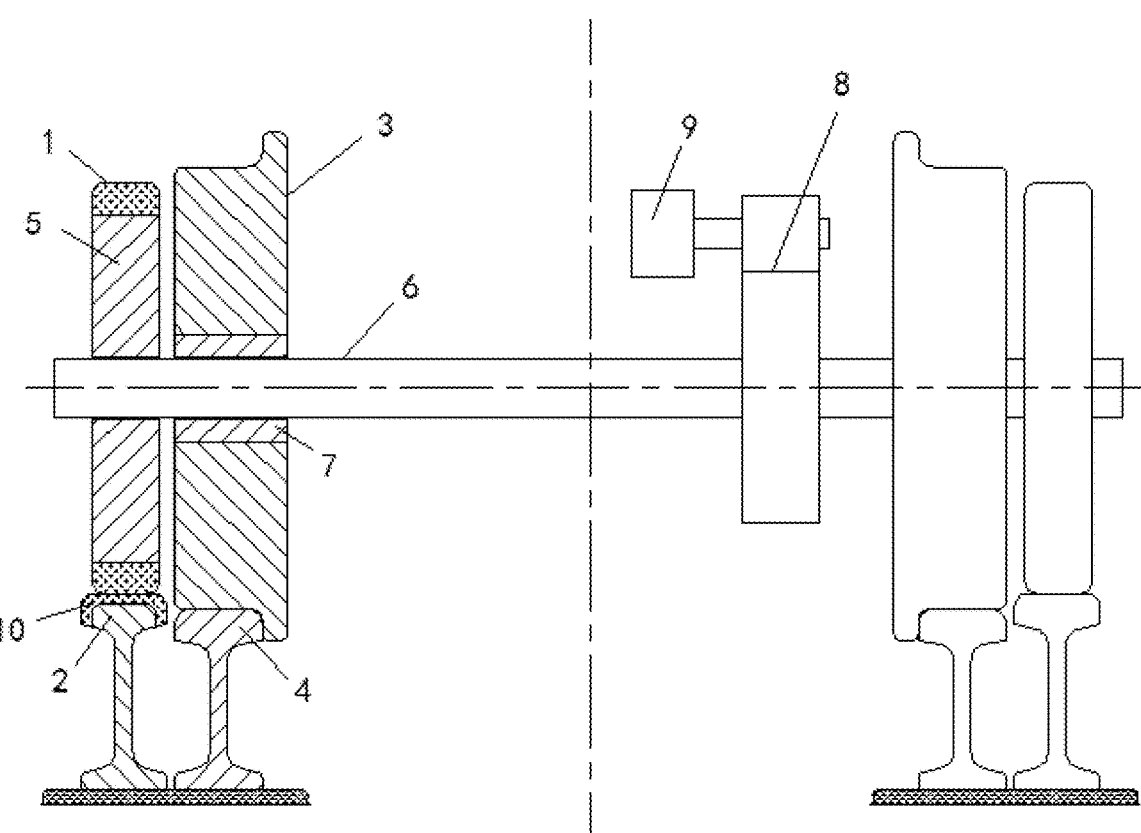
FIG. 1 is a schematic structural diagram of the wheel rail system according to an exemplary embodiment.

As shown in FIG. 1, this embodiment provides a composite powered wheel set, which comprises two booster wheels 1 and two support wheels 3 that are mounted on a driving axle 6, wherein the support wheels 3 are mounted on the driving axle 6 via bearings 7, the driving axle 6 is connected to a first transmission device 8, the first transmission device 8 is connected to a first power mechanism 9, and the driving axle 6 is further connected to a train bogie via a connecting device.

Specifically, in the implementation of this embodiment, the booster wheels 1 are fitted with the booster rails 2, the support wheels 3 are fitted with the running rails 4, and the weight of the train is shared between the booster wheels 1 via the booster rails 2 and the support wheels 3 via the running rails 4. The booster rails 2 may be laid on a railway section where anti-skid performance should be improved; for example, the booster rails 2 may be laid on a steep slope section with a slope greater than or equal to 3%. The booster wheels 1 don't contact with the rails when the train runs on a railway section without the booster rails 2; the booster wheels 1 are fitted with the booster rails 2 when the train runs on a railway section provided with the booster rails 2, and, in this case, the first power mechanism 9 drives the driving axle 6 to rotate via the first transmission device 8, then the driving axle 6 drives the booster wheels 1 to rotate (here, the booster wheels 1 are driving wheels, while the support wheels 3 only provide support and are driven wheels since the support wheels 3 are mounted on the driving axles via bearings), thereby the booster wheels 1 cooperate with the booster rails 2 to provide traction to the train. Thanks to the high adhesion between the booster wheels 1 and the booster rails 2, high friction force is achieved, the anti-skid performance of the wheel rails and the traction can be improved, so that the train will not skid when running on a steep slope section or under a high traction load. Thus, the traction and braking force of the train can be applied well, the safety of the train can be improved, the limitations on the slope of the railway (tracks), the traction load of the train and the train speed can be eliminated to a great extent, and the application scope of the wheel rails can be expanded. The well-fitting between the support wheels 3 and the running rails 4 can ensure smooth and steady train running. In addition, in view that the booster wheels 1 have to run across the running rails in a turnout area since the booster rails 2 are interrupted at the turnout, the radius of the booster wheels 1 may be close to the radius of the support wheels 3 as far as possible but should not be greater than the radius of the support wheels 3. Since the support wheels 3 are mounted to the driving axle 6 via bearings 7, the same linear speed can be achieved so that the booster wheels 1 and the support wheels 3 can run forward synchronously even if the radius of the booster wheels 1 is different from the radius of the support wheels 3.

In the implementation of this embodiment, the booster rails 2 and the running rails 4 may be steel rails, while the booster wheels 1 may be rubber wheels. In the case that the booster wheels 1 are rubber wheels, the metal rims 5 of the rubber wheels are fixedly mounted to the driving axle 6. Since the friction between rubber and steel rails is greater than that between steel wheels and steel rails, the anti-skid performance of the wheel set of the train can be improved by using rubber wheels. In addition, the rubber wheels may be rubber wheels having adjustable air pressure, so that the contact force and adhesion between the rubber wheels and the booster rails can be adjusted. Alternatively, the friction can be increased by adding patterns on the treads of the booster rails 2 and the booster wheel 1, or rubber sleeves may be further provided on the surfaces of the booster rails, in order to improve the friction further by utilizing the rubber wheels and the rubber sleeves of the booster rails in combination.

Preferably, two booster wheels 1 are provided for each driving axle 6, and the two booster wheels 1 are mounted on the two ends of the moving axle 6, and the support wheels 3 are located at the inner side of the two booster wheels 1 respectively. In this embodiment, two booster wheels 1 are provided, and are symmetrically mounted on the two ends of the driving axle 6 in the form of a wheel set.

Preferably, the radius of the booster wheels 1 is not greater than the radius of the support wheels 3.

Embodiment 2

This embodiment provides a train comprising the composite powered wheel described in the embodiment 1. The train provided by this embodiment further comprises an ordinary powered wheel set composed of an ordinary driving axle and wheels, wherein the ordinary driving axle is connected to a second transmission device, the second transmission device is connected to a second power mechanism, the driving axle is further connected to a train bogie via a connecting device, and the ordinary powered wheel set and the composite powered wheel set are mounted to different bogies respectively.

It should be noted here that the booster wheels 1 of the train are fitted with the booster rails 2, and the support wheels 3 of the train are fitted with the running rails 4. In actual operation, the traction and braking force are provided to the train solely via the ordinary powered wheel set on a railway section without the booster rails 2; the traction and braking force are provided to the train solely via the composite powered wheel set on a railway section provided with the booster rails 2. In addition, each carriage of the train is provided with two bogies. In this embodiment, in the arrangement of the ordinary powered wheel sets and the composite powered wheel sets, the two bogies of each of several carriages of the train may be equipped with the ordinary powered wheel sets solely, while the two bogies of each of the other carriages of the train may be equipped with the composite powered wheel sets solely; or one bogie of each carriage may be equipped with the ordinary powered wheel set, while the other bogie of each carriage may be equipped with the composite powered wheel set; or the composite powered wheel sets and the ordinary powered wheel sets may be arranged and mounted rationally according to the total number of the composite powered wheel sets and the ordinary powered wheel sets.

Preferably, the length of the section of the train equipped with the composite powered wheel sets from the front side to the rear side is greater than the length of the turnout area. Here, the length of the section of the train equipped with the composite powered wheel sets from the front side to the rear side refers to the length of the train between the first booster wheel set and the last booster wheel set. The purpose of such an arrangement is to ensure that at least one booster wheel set run on the booster rails 2 when the train passes through the turnout area, so as to ensure that at least one booster wheel set can provide traction or braking force to the train. Of course, in the actual implementation of this embodiment, the length of the turnouts and the arrangement of the wheel sets of the train may be configured reasonably according to the actual situation, for example, to ensure at least two booster wheel sets run on the booster rails 2.

Embodiment 3

This embodiment provides a wheel-rail system comprising the composite powered wheel set described in the embodiment 1. The wheel-rail system provided by this embodiment further comprises booster rails 2 and running rails 4 that are laid in parallel, wherein the booster rails 2 are fitted with the booster wheels 1, while the running rails 4 are fitted with the support wheels 3.

Preferably, the surface of the booster rail 2 may be provided with a rubber sleeve 10; alternatively, the surface of the booster rail 2 may be provided with patterns. By providing rubber sleeves 10 or patterns on the booster rails 2, the adhesion and friction between the booster wheels 1 and the booster rails can be further improved.

Preferably, no booster rail 2 is provided in turnout areas.

Figure 2:
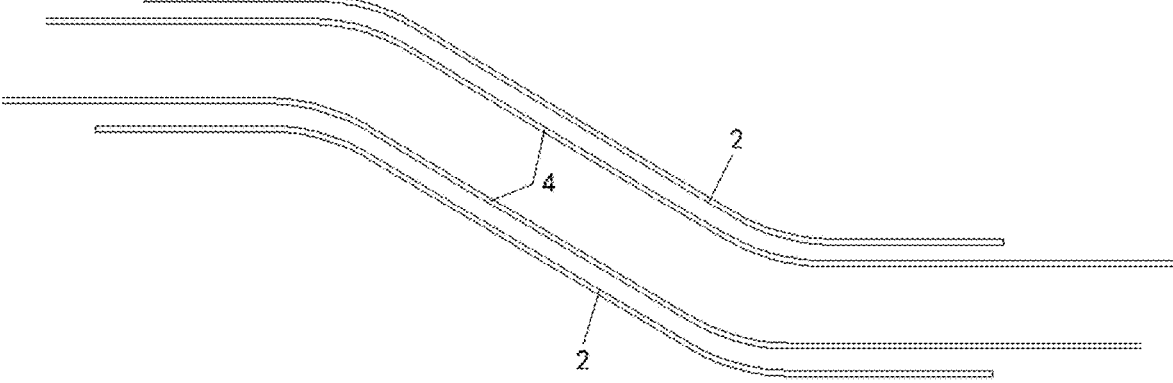
FIG. 2 is a top view of exemplary booster rails and running rails.

Preferably, the booster rails 2 may be laid on a slope section with a slope greater than or equal to 3%; further preferably, as shown in FIG. 2, the booster rails 2 may be further laid on the railway line before the slope section with a slope greater than or equal to 3% and on the railway line after the slope section with a slope greater than or equal to 3%, and both the length of the booster rails 2 before the slope section with a slope greater than or equal to 3% and the length of the booster rails 2 after the slope section with a slope greater than or equal to 3% are greater than or equal to the train length. It should be noted here that the booster rails 2 laid on the slope section are connected with the booster rails 2 before the slope section; likewise, the booster rails 2 laid on the slope section are connected with the booster rails 2 after the slope section.

In this embodiment, booster rails 2 in length greater than the train length are laid on the railway line before the slope section with a slope greater than or equal to 3%, so that the train can accomplish power switching before it enters the slope section, i.e., the train accomplishes power switching from a mode in which the traction is provided to the train via the ordinary powered wheel sets solely to a mode in which the traction is provided to the train via the composite powered wheel sets solely, in order to ensure that the train has enough adhesion and friction once it enters the slope section with a slope greater than or equal to 3%. Likewise, to ensure that the traction is provided to the train via the composite powered wheel sets on the entire slope section, the train should not carry out power switchover, i.e., switching from the mode in which the traction is provided to the train via the composite powered wheel sets solely to the mode in which the traction is provided to the train via the ordinary powered wheel sets solely. To that end, booster rails 2 in length greater than the train length are laid on the railway line after the slope section.

Embodiment 4

This embodiment provides a method for controlling the train described in the embodiment 2, which is applied in a train control system and comprises:

controlling the first power mechanism 9 to power on, and controlling the second power mechanism to power off at the same time, as long as any of the booster wheel 1 of the train comes into contact with a booster rail 2; and controlling the first power mechanism 9 to power off, and controlling the second power mechanism to power on at the same time, if all of the booster wheels 1 of the train leave booster rails 2;

wherein the booster rails 2 are laid in a way that they are fitted well with the booster wheels 1 of the train.

The wheel-rail system relates a train using composite powered wheel sets and a track structure, and comprises a train using composite powered wheel sets and an associated track structure. Each train carriage is provided with two different bogies. The ordinary powered wheel sets are the powered wheel sets used on existing trains. Owing to the fact that both the wheel treads of ordinary powered wheel sets and the steel rails are made of steel, the friction between the wheel treads and the steel rails is low, and the ordinary powered wheel sets are not suitable for train operation on slope sections with a slope greater than or equal to 3% in mountainous areas. The crossbeam of the bogies is provided with a power mechanism and a transmission device, and a driving axle and wheel set structure connected with the transmission device. In view that the bogies for ordinary powered wheel sets are not shown in the figures, the associated components, e.g., the power mechanism, are referred to as "second" ones. The track structure involved in this application comprises booster rails 2 laid in parallel to the running rails 4. The bogie for a composite powered wheel set comprises a first power mechanism and a first transmission device, wherein the first transmission device (as labeled in FIG. 1) is coupled to the driving axle 6 via gears, and the driving axle 6 is connected to the bogie of the train via a series of suspensions; the two ends of the driving axle 6 are provided with a booster wheel 1 respectively to form a booster wheel set structure; the inner sides of the booster wheels of the booster wheel set structure are provided with support wheels 3 coaxially, the wheel hubs of the support wheels 3 are in interference fit with the outer rings of the bearings 7, and the inner rings of the bearings 7 are in interference fit with the driving axle 6; the booster wheels 1, the support wheels 3 and the driving axle 6 form a composite powered wheel set structure; the composite pow- ered wheel set structure and a second powered wheel set structure are arranged on different bogies of the same train carriage respectively or arranged on different bogies of different train carriages respectively.

The booster rails 2 are laid on the two sides of the main line (e.g., running rails) of a slope section with a slope greater than or equal to 3%.

The first power mechanism or the second power mecha- nism operates alternatively when the train enters a railway section with a slope greater than 3% or a railway section with a slope smaller than 3%.

While some preferred embodiments of the present disclo- sure are described above, it should be noted that those preferred embodiments should not be deemed as constituting any limitation to the present disclosure, and the scope of protection of the present disclosure is only defined by the claims. Those having ordinary skills in the art can make various improvements and modifications without departing from the spirit and scope of the present disclosure, but all such improvements and modifications should be deemed as falling in the scope of protection of the present disclosure.

The invention claimed is:

1. A train comprising a composite powered wheel set and an ordinary powered wheel set, wherein the composite powered wheel set comprises a driving axle, two booster wheels and two support wheels, wherein the support wheels are arranged on two ends of the driving axle, the booster wheels are arranged at the outer side of the support wheels respectively, the sup- port wheels are mounted to the driving axle via inner rings of bearings, the driving axle is connected to a first transmission device via gears, the first transmission device is connected to a first power mechanism, and the ordinary powered wheel set is composed of an ordi- nary driving axle and wheels, wherein the ordinary driving axle is connected to a second transmission device, the second transmission device is connected to a second power mechanism, and the ordinary powered wheel set and the composite powered wheel set are mounted to different bogies respectively.

2. The train of claim 1, wherein the booster wheel is a rubber wheel and comprises a metal rim and a rubber tire, wherein the metal rim is fixed to the driving axle, the rubber tire has adjustable air pressure, and the tread of the rubber tire is provided with patterns.

3. The train of claim 1, wherein the radius of the booster wheel is smaller than that of the support wheel.

4. A method for controlling a train comprising a compos- ite powered wheel set and an ordinary powered wheel set, wherein the composite powered wheel set comprises a driving axle, two booster wheels and two support wheels, wherein the support wheels are arranged on two ends of the driving axle, the booster wheels are arranged at the outer side of the support wheels respectively, the sup- port wheels are mounted to the driving axle via inner rings of bearings, the driving axle is connected to a first transmission device via gears, the first transmission device is connected to a first power mechanism, the ordinary powered wheel set is composed of an ordi- nary driving axle and wheels, wherein the ordinary driving axle is connected to a second transmission device, the second transmission device is connected to a second power mechanism, and the ordinary powered wheel set and the composite pow- ered wheel set are mounted to different bogies respec- tively, the method is applied in a train control system and comprises:

controlling the first power mechanism to power on, and controlling the second power mechanism to power off at the same time, as long as any of the booster wheels of the train comes into contact with a booster rail; and controlling the first power mechanism to power off, and controlling the second power mechanism to power on at the same time, if all of the booster wheels of the train leave booster rails.

* * * * *